United States Patent Office 3,756,979
Patented Sept. 4, 1973

3,756,979
METHOD OF PLASTICIZING VINYL HALIDE POLYMERS
Romeo J. Ventres, 58 Clark St., Worcester, Mass. 01606; Eugene A. Duchesneau, Jr., P.O. Box 435, Ashburnham, Mass. 01430; and Constantine Rosis, 35 Yorktown Road, West Boylston, Mass. 01583
No Drawing. Filed Jan. 21, 1971, Ser. No. 108,554
Int. Cl. C08f 45/40, 47/00
U.S. Cl. 260—34.2        5 Claims

ABSTRACT OF THE DISCLOSURE

This invention relates to an improved method for plasticizing polyvinyl halides, wherein the plasticized product is stabilized against discoloration. Generally, the method comprises the steps of wet ball milling the resin in a liquid slurry for a specified period of time, deliquifying and drying the resin of said slurry, then adding plasticizer and recovering the plasticized product.

BACKGROUND OF THE INVENTION

Dry ball milling of polymer resins has been performed to improve the dry blending properties of the resin. Although that method was successful for the intended purpose, the method suffered from numerous disadvantages. More specifically, dry ball milling caused very fine resin particle formation and severely discolored the resin. These disadvantages are overcome by the present invention.

SUMMARY OF THE INVENTION

Broadly, this invention contemplates a process for improving the dry-up time of a polyvinyl halide comprising the steps of wet ball milling a polyvinyl halide resin in a liquid slurry having a solids content of from about 10% to about 70% by weight of said slurry, said ball mill having from about 50% to about 95% of its capacity occupied by said balls, continuing said wet ball milling for a period of time of from about ½ hour to about 45 hours, removing said slurry from said mill, deliquifying and drying the polyvinyl halide resin of said slurry, whereby dry-up time is improved while maintaining heat stability of said resin.

DETAILED DESCRIPTION OF THE INVENTION

In practicing this invention, a slurry of a polyvinyl resin prepared by, for example, suspension polymerization is placed in a ball mill. The ball mill is started and the resin is wet-ground from about ½ to about 45 hours, at which time the resin is removed, dewatered and dried. The dry resin is then mixed with a plasticizer. When the plasticizer is mixed with the resin, initially a lumpy mass is obtained. However, as the plasticizer is absorbed by the resin, the lumpiness dissipates and the mixture gradually becomes a free-flowing powder. The "dry-up time" is defined as the time required, from the addition of plasticizer, for the mixture to acquire free-flowing characteristics.

Regardless of the manner by which the polyvinyl halide is prepared, any polyvinyl halide may be processed according to this invention as long as such halide is capable of absorbing plasticizer under dry blending conditions.

Among the polyvinyl halides which are capable as aforesaid, may be mentioned polyvinyl chloride, polyvinylidene chloride, polyvinyl fluoride, polyvinyl bromide, and the like.

If desired, the process of this invention may also be applied to polyvinyl halide copolymers such as, for example, any of the above vinyl halides with vinyl acetate, methyl methacrylate, methyl acrylate, ethyl acrylate, vinyl ether, styrene, and the like.

If a copolymer containing a polyvinyl halide is used, the polyvinyl halide should comprise at least about 50 mole percent of the copolymer.

It is preferred that the polyvinyl halide be prepared via suspension polymerization. The suspension polymerization of a polyvinyl halide, such as polyvinyl chloride, may be accomplished by polymerizing monomeric vinyl chloride in an aqueous media containing a suspending agent such as carboxymethyl cellulose, a surface active agent such as a block polymer of ethylene and propylene oxides, and a catalyst such as lauroyl peroxide or diisopropyl peroxydicarbonate or catalyst mixtures and the like. The polymerization reaction is conducted at a temperature of between about 100° F. to about 160° F. for a period of time of from about 6 to about 18 hours.

The aqueous surry which is placed in the ball mill may be the same slurry which is removed from the polymerization reactor.

If desired, the slurry from the polymerization reactor may be dewatered, using standard equipment such as a centrifuge and then dried, using a standard drier such as a rotary drum drier or spray drier. The dried resin may then be mixed with a liquid other than the reaction liquid, provided the liquid used is not a solvent for the polyvinyl halide. Among the liquids which may be used are alcohols and aliphatic or aromatic hydrocarbons. Examples of these are methanol, ethanol, butanol, hexanol, isopropanol, decane, hexane, benzene, xylene and toluene and the like. Mixtures can also be used such as methanol-acetone and the like.

Regardless of whether the polyvinyl halide resin is placed in the ball mill as a slurry taken from the polymerization reactor, or whether the polyvinyl halide resin is dewatered, dried and reslurried with a different liquid, the slurry which is placed into the ball mill should have a solids content of from about 10% to about 70% by weight of said slurry to assure optimum results. It is preferred, however, that the slurry have a solids content of from about 20% to about 50%.

When the grindable slurry is placed in the ball mill, the balls in the mill should occupy from about 50% to about 95% of the capacity of the mill.

The grindable resin slurry is then ground for a period of time of from about ½ hour to 45 hours or longer and preferably from about 6 to about 20 hours.

The ball milling is preferably conducted at ambient temperature, although any temperature below that at which the resin will be degraded is suitable. For example, when the grindable slurry is an aqueous one, the temperature may vary from just above 0° C. up to about 95° C. When a liquid other than water is present, the temperature will vary more widely. For example, a temperature lower than 95° C. would be used when acetone is the slurry liquid. Conversely, when a slurry liquid having a boiling point higher than water is used, a temperature higher than 95° C. may be used. If the liquid used in the slurry is a high boiling one, care must be exercised in controlling the grinding temperature to assure, as noted above, that the resin itself will not be adversely affected by the temperature so as to degrade it.

After ball milling has been completed, the resin slurry is removed from the ball mill, dewatered and dried as described in connection with the substitution of other slurry liquids for the polymerization liquid used.

After the polymer resin has been removed from the ball mill and dried, a plasticizer may be added to the resin. Upon adding the plasticizer to the resin, it is found that the dry-up time is vastly improved.

Any plasticizer may be added in standard amounts to the ground polyvinyl halide resin. Such standard amounts generally are from about 25 to about 100 parts based on 100 parts of resin. Among the plasticizers which may be used are dioctyl phthalate, diisodecyl phthalate, octyldecyl phthalate, ethyl hexyl adipate, a polymeric epoxy plasticizer, and the like.

In order to more fully illustrate the nature of this invention and the manner of practicing the same, the following examples are presented.

Example 1

A ball mill having 66% of its capacity occupied by a Burundum grinding medium was charged with an aqueous slurry of polyvinyl chloride. The polyvinyl chloride was prepared by means of suspension polymerization utilizing lauroyl peroxide as the catalyst and carboxymethyl cellulose as the suspending agent. The polyvinyl chloride slurry contained 30% solids based on the weight of the entire slurry.

Grinding is conducted for a period of time ranging from 4 hours to 28 hours. The grinding was accomplished at room temperature.

One sample of the slurry is not ground in the ball mill. The other samples are removed from the ball mill at regular intervals.

All of the samples are dewatered using a centrifuge and then dried by a standard drier utilizing an inlet temperature of 300° F. and drier outlet temperature of 140° F.

The samples are then tested for their dry-up time, i.e. the time required for the samples to absorb the plasticizer. The plasticizer used is dioctyl phthalate.

The dry-up time is determined as follows. 400 grams of dried polyvinyl chloride are placed in a beaker. Placed in a second beaker are 200 grams of dioctyl phthalate and 0.25 grams of a violet oil dye. The polyvinyl chloride resin is added to a hot ribbon blender which is preheated to a temperature of 250° F. The 200 grams of dioctyl phthalate dye solution are added at a uniform rate over a period of 15 seconds. Immediately after completion of the addition of the dioctyl phthalate-dye solution the stop watch is started. As the drying point approaches, small pieces of filter paper are added at 15 second intervals and the time of addition of the filter papers is recorded on the papers themselves. Addition of the filter paper is continued until no further coloration of the paper is noted and the material in the blender is free flowing. The mixture is then removed from the blender and the filter papers are recovered and placed in the order of their time of addition. The dry-up time is recorded as the time of addition of the first filter paper not totally tinted with dye.

The dry-up time is also determined on some of the samples using the Brabender Plastograph.

210 grams of dried polyvinyl chloride resin, 14.7 grams of number 30 Burgess clay and 21 grams of a basic carbonate white lead are mixed together and screened through a 20 mesh screen. All of the ingredients are forced through the screen. This mixture is added to a stainless steel Sigma mixer and is dry-mixed for 4½ minutes. 109.2 grams of dioctyl phthalate is added to the mixture. Initially, a lumpy mass is obtained. The dry-up time is determined from the point of addition of the dioctyl phthalate to the midpoint of the torque drop-off slope. The drop-off portion of the curve indicates the end of the lumpy stage. An average line is drawn on the chart through the drop-off portion of the curve at the end of the lumpy stage. An average line is drawn through a section of the curve immediately following the dry point. The Brabender dry-up time is the interval from the time of addition of dioctyl phthalate to the intersection of the two lines in minutes.

Additionally, the polyvinyl chloride resin is screened through a series of mesh screens to indicate the effect of the varying grinding periods on the bulk density of the samples.

It is expected that there would be some reduction in sample bulk density due to the rounding of the resin particles and the resultant closer packing of these particles.

The bulk density is determined by taking a weighed sample of the polyvinyl chloride resin and placing it in a graduate. The graduate is tapped several times to assure settling. The bulk density is then calculated from the volume the weighed sample occupies.

An attempt is made to dry ball mill a sample of the dried polyvinyl chloride resin prepared above and to compare the tests conducted on the other samples with the same tests conducted on the dry ball milled sample. Such tests, however, are not possible to perform due to the fact that the heat stability of the dry balled portion is adversely affected by the dry ball milling so that the dry ball milled portion becomes pink and even fuses when longer milling temperatures are used. This indicates that thermal decomposition has taken place and it is not possible to perform the above tests on the dry ball milled sample.

The following table expresses the results of the above tests.

TABLE 1

| Time of wet ball milling | Bulk density | Ribbon blender dry-up time | Brabender dry-up time | Screen analysis, percent retained mesh | | | |
|---|---|---|---|---|---|---|---|
| | | | | 40 | 100 | 140 | 200 |
| Hours: | | | | | | | |
| 0 | 0.432 | 3 min., 30 sec. | 4 min., 45 sec. | 0 | 11.4 | 81.0 | 5.4 |
| 8 | 0.500 | 3 min., 0 sec. | N.D. | 0 | 5.2 | 84.0 | 9.2 |
| 12 | 0.530 | 2 min., 45 sec. | 3 min., 5 sec. | 0 | 4.8 | 82.8 | 11.4 |
| 16 | 0.544 | 2 min., 30 sec. | N.D. | 0 | 4.2 | 81.8 | 13.0 |
| 20 | 0.542 | 2 min., 0 sec. | 2 min., 30 sec. | 0 | 4.2 | 80.4 | 13.8 |
| 24 | 0.543 | 2 min., 0 sec. | N.D. | 0 | 4.0 | 80.0 | 14.2 |
| 28 | 0.523 | 2 min., 0 sec. | 2 min., 15 sec. | 0 | 3.4 | 79.2 | 15.0 |

N.D.=Not determined.

The above results demonstrate that wet ball milling greatly improves the dry-up time of polyvinyl halide resin without adversely effecting the particle size of the polyvinyl halide resin.

Example 2

The procedure of ball milling described in Example 1 is repeated several times. Each time the percent of the capacity of the mill which the balls occupy is varied. The percent which the balls occupy is 50%, 60%, 75%, and 92%. In each instance good results are obtained.

Example 3

The procedure of Example 1 is repeated except that the time of ball milling is varied several times. The time of ball milling is conducted at 1, 4, 32, 36, 40 and 44 hours. In each instance good results are obtained.

Example 4

The procedure of Example 1 is repeated several times except that the polyvinyl chloride resin is dewatered and dried as described in Example 1 and the resin is reslurried with a different slurry liquid to the same solids content as in the reaction slurry of Example 1. The ball milling proceeds as described in Example 1. The liquids used in place of the water of the reaction slurry are methanol, methanol-acetone mixture, hexane, benzene, toluene, dodecane and xylene. In each instance good results are obtained.

Example 5

The procedure of Example 1 is repeated except that polymers other than polyvinyl chloride are used and copolymers containing polyvinyl chloride are used. The polymers used are polyvinylidene chloride, polyvinyl fluoride, polyvinyl bromide; copolymers of vinyl chloride with vinyl acetate, methyl methacrylate, methylacrylate, ethylacrylate and vinyl ether. In each case good results are obtained.

Example 6

The procedure of Example 1 is repeated several times except that each time the temperature at which ball milling is conducted is varied. The temperatures used are 20° C., 30° C., 50° C., 70° C., and 85° C. In each instance good results are obtained.

Example 7

The procedure of Example 1 is repeated except that the solids content of the polyvinyl chloride used is varied. The solids content used is 10%, 20%, 40%, 52%, 61%, and 70%. In each instance good results are obtained.

While this invention has been described in terms of certain preferred embodiments and illustrated by means of specific examples, the invention is not to be construed as limited except as set forth in the following claims.

What is claimed is:

1. An improved process for plasticizing a vinyl chloride resin prepared by suspension polymerization in an aqueous slurry comprising the steps of wet ball milling the resin in the aqueous slurry, the aqueous slurry having solids content of from about 10% to about 70% by weight of said slurry and being free of solvent for the vinyl chloride resin, said ball mill having solids content from about 50% to 95% of its capacity occupied by said balls, continuing said wet ball milling for a period of time of at least ½ hour, removing said slurry from said mill, deliquifying and drying the vinyl chloride resin of said slurry, admixing with a dry resin a plasticizer in an amount of from about 25 to about 100 parts of resin, for a time sufficient for the plasticized resin to acquire free flowing craracteristics, and recovering the plasticized resin, said resin being heat stabilized against discoloration.

2. A process according to claim 1 wherein the liquid of said liquid slurry consists of water.

3. A process according to claim 1, wherein said ball milling is continued for a period of time of from about 6 to about 20 hours.

4. The process according to claim 1, wherein said vinyl chloride containing resin is a copolymer of vinyl chloride with a member selected from the group consisting of vinyl acetate, methyl methacrylate, methyl acrylate, ethyl acrylate, vinyl ether, and styrene, the proportion of vinyl chloride in the copolymer being at least 50 mole percent.

5. An improved process for plasticizing polyvinyl chloride resin prepared by suspension polymerization in an aqueous slurry comprising the steps of wet ball milling the resin in a water slurry having solids content of from about 10% to about 70% by weight of said slurry, said slurry being free of solvent for the polyvinyl chloride said ball mill having from about 50% to 95% of its capacity occupied by said balls, continuing said wet ball milling for a period of time of from 6 hours to 20 hours removing said slurry from said mill, deliquifying and drying the polyvinyl chloride resin of said slurry, admixing with the dry resin a plasticizer in an amount of from about 25 to 100 parts for each 100 parts of resin, for a time sufficient for the plasticized resin to acquire free flowing characteristics, said time to effect the free flowing characteristics for the resin being from apporximately 60% to 90% of the corresponding period of time required to effect free flowing characteristics for a unit of untreated resin and recovering the plasticized resin, said resin being heat stabilized against discoloration.

References Cited

UNITED STATES PATENTS

| | | | |
|---|---|---|---|
| 3,150,834 | 9/1964 | Doyle et al. | 241—15 |
| 2,786,822 | 3/1957 | Vesce | 260—41 |
| 3,636,149 | 12/1969 | Tambini | 264—168 |

FOREIGN PATENTS

| | | | |
|---|---|---|---|
| 1,046,298 | 10/1966 | Great Britain | 264—210 F |
| 1,034,401 | 6/1966 | Great Britain | 264—210 F |
| 37-7903 | 7/1962 | Japan | 264—210 F |

OTHER REFERENCES

Sarvelnick, Harold A., Polyvinyl Chloride, 1969, Van Nostrand Reinhold Co., New York, pp. 139–140.

MORRIS LIEBMAN, Primary Examiner

J. H. DERRINGTON, Assistant Examiner

U.S. Cl. X.R.

241—15, 16; 260—30.4 R, 31.8 R

UNITED STATES PATENT OFFICE
CERTIFICATE OF CORRECTION

Patent No. 3,756,979            Dated September 4, 1973

Inventor(s) Romeo J. Ventres, Eugene A. Duchesneau, Jr., Constantine Rosis

It is certified that error appears in the above-identified patent and that said Letters Patent are hereby corrected as shown below:

Col. 2 l. 16 "surry" should be changed to ---slurry---

Col. 5 l. 20 delete "solids content"

Col. 5 l. 25 "a" should be changed to --the--

Signed and sealed this 26th day of February 1974.

(SEAL)
Attest:

EDWARD M. FLETCHER, JR.             C. MARSHALL DANN
Attesting Officer                   Commissioner of Patents

UNITED STATES PATENT OFFICE
CERTIFICATE OF CORRECTION

Patent No. 3,756,979     Dated 9-4-73

Inventor(s) R. J. Ventres, E. Duchesneau & C. Rosis

It is certified that error appears in the above-identified patent and that said Letters Patent are hereby corrected as shown below:

Assignee: Borden, Inc.

Signed and sealed this 17th day of September 1974.

(SEAL)
Attest:

McCOY M. GIBSON JR.
Attesting Officer

C. MARSHALL DANN
Commissioner of Patents